United States Patent
Hirata

(10) Patent No.: US 10,496,342 B2
(45) Date of Patent: Dec. 3, 2019

(54) PRINTING SYSTEM, METHOD, AND PROGRAM FOR IMPLEMENTING SERVICE COORDINATION AMONG A PLURALITY OF SECURITY DOMAINS

(71) Applicant: CANON KABUSHIKI KAISHA, Tokyo (JP)

(72) Inventor: Kensuke Hirata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 233 days.

(21) Appl. No.: 14/955,530

(22) Filed: Dec. 1, 2015

(65) Prior Publication Data
US 2016/0154616 A1    Jun. 2, 2016

(30) Foreign Application Priority Data

Dec. 2, 2014    (WO) ............... PCT/JP2014/081854

(51) Int. Cl.
*G06F 3/12* (2006.01)
*H04L 29/08* (2006.01)
*H04L 29/06* (2006.01)

(52) U.S. Cl.
CPC .......... *G06F 3/1222* (2013.01); *G06F 3/1238* (2013.01); *G06F 3/1247* (2013.01); *G06F 3/1267* (2013.01); *G06F 3/1288* (2013.01); *G06F 3/1292* (2013.01); *H04L 63/0227* (2013.01); *H04L 63/102* (2013.01);
(Continued)

(58) Field of Classification Search
None
See application file for complete search history.

(56) References Cited

U.S. PATENT DOCUMENTS

2007/0288322 A1* 12/2007 Watanabe .......... G06Q 20/0453 705/21
2013/0044343 A1*  2/2013 Matsugashita ........ G06F 3/1222 358/1.14

(Continued)

FOREIGN PATENT DOCUMENTS

EP    1895440 A1    3/2008
JP    2002183091 A    6/2002

(Continued)

*Primary Examiner* — Mohammad H Ghayour
*Assistant Examiner* — Pawan Dhingra
(74) *Attorney, Agent, or Firm* — Canon U.S.A., Inc. IP Division

(57) ABSTRACT

In the coordination of a data conversion server and a storage server which belong to different security domains, a client terminal is able to replace an authorization token for accessing the data conversion server with a temporary URL on the storage server, the client terminal, which is located outside the data exchange server, will be able to issue a temporary URL without authorization, resulting in a file operation which is not intended by the data conversion server being performed. Scopes for allowing a client terminal to access the data conversion server and scopes necessary for the issuance of a temporary URL are separated from each other, and a limitation is imposed so that the scopes for the issuance of a temporary URL can be used only by the data conversion server, thereby enabling secure provision of a temporary URL to an external client terminal.

15 Claims, 9 Drawing Sheets

(52) U.S. Cl.
    CPC ............ *H04L 67/02* (2013.01); *H04L 67/04* (2013.01); *H04L 67/10* (2013.01); *H04L 67/2823* (2013.01)

(56) References Cited

U.S. PATENT DOCUMENTS

| | | | |
|---|---|---|---|
| 2013/0047216 A1* | 2/2013 | Ajitomi ................ | G06F 9/541 726/4 |
| 2013/0083362 A1* | 4/2013 | Tanaka ............... | H04N 1/00244 358/1.16 |
| 2013/0185809 A1* | 7/2013 | Yabe .................. | H04L 63/10 726/28 |
| 2014/0240761 A1* | 8/2014 | Nagai .................. | G06F 3/1222 358/1.15 |
| 2015/0015908 A1* | 1/2015 | Tanaka ............... | G06K 15/4095 358/1.14 |

FOREIGN PATENT DOCUMENTS

| | | |
|---|---|---|
| JP | 2012194772 A | 10/2012 |
| JP | 2013145506 A | 7/2013 |

\* cited by examiner

FIG. 4A

DOCUMENT INFORMATION 400  401  402  403

| DOCUMENT ID | CLIENT ID | DOCUMENT URL |
|---|---|---|
| 45787890-34e4-32a4-8921-446655440000 | mobile0001 | https://strage.com/mobile0001/documents/45787890-34e4-32a4-8921-446655440000/45787890-34e4-32a4-8921-446655440000.docx |
| 14290453-1ee2-33a5-5647-890771346112 | mobile0002 | https://strage.com/mobile0002/documents/14290453-1ee2-33a5-5647-890771346112/14290453-1ee2-33a5-5647-890771346112.pdf |
| 87629123-16c8-32a8-1245-532394780235 | print0001 | https://strage.com/print0001/documents/87629123-16c8-32a8-1245-532394780235/87629123-16c8-32a8-1245-532394780235.pdf |
| 33677112-6c5b-8d71-3452-128923434545 | mobile0003 | https://strage.com/mobile0003/documents/33677112-6c5b-8d71-3452-128923434545/33677112-6c5b-8d71-3452-128923434545.xlsx |
| 76541823-5d6c-7789-1147-564252345234 | mobile0002 | https://strage.com/mobile0002/documents/76541823-5d6c-7789-1147-564252345234/76541823-5d6c-7789-1147-564252345234.txt |

FIG. 4B

DATA CONVERSION INFORMATION 410

411  412  413  414  415  416

| DATA CONVERSION ID | CLIENT ID | DOCUMENT ID | PRINT TICKET URL | INDEX URL | STATUS |
|---|---|---|---|---|---|
| ff169537-acd7-46f5-9cd6-73df860334f4 | mobile0001 | 45787890-34e4-32a4-8921-446655440000 | https://strage.com/mobile0001/convertjobs/ff169537-acd7-46f5-9cd6-73df860334f4/ticket/ticket.xml | https://strage.com/mobile0001/convertjobs/ff169537-acd7-46f5-9cd6-73df860334f4/index/index.json | ALREADY CONVERTED |
| 1dd3b180-57fe-11e4-8eca-0a85caef494e | mobile0002 | 14290453-1ee2-33a5-5647-890771346112 | https://strage.com/mobile0002/convertjobs/1dd3b180-57fe-11e4-8eca-0a85caef494e/ticket/ticket.xml | https://strage.com/mobile0002/convertjobs/1dd3b180-57fe-11e4-8eca-0a85caef494e/index/index.json | ALREADY CONVERTED |
| 69388d70-58e0-11e4-8eca-0a85caef494e | print0001 | 87629123-16c8-32a8-1245-532394780235 | https://strage.com/print0001/convertjobs/87629123-16c8-32a8-1245-532394780235/ticket/ticket.xml | https://strage.com/print0001/convertjobs/87629123-16c8-32a8-1245-532394780235/index/index.html | STANDBY |
| 8c5ea5a0-597b-11e4-8eca-0a85caef494e | mobile0003 | 33677112-6c5b-8d71-3452-128923434545 | https://strage.com/mobile0003/convertjobs/33677112-6c5b-8d71-3452-128923434545/ticket/ticket.xml | https://strage.com/mobile0003/convertjobs/33677112-6c5b-8d71-3452-128923434545/index/index.json | STANDBY |
| ca414790-58dd-11e4-8eca-0a85caef494e | mobile0002 | 76541823-5d6c-7789-1147-564252345234 | https://strage.com/mobile0002/convertjobs/76541823-5d6c-7789-1147-564252345234/ticket/ticket.xml | https://strage.com/mobile0002/convertjobs/76541823-5d6c-7789-1147-564252345234/index/index.json | STANDBY |

FIG. 4C

EXAMPLE INDEX 420

```
{
    "dataList":[
        "https://strage.com/mobile0001/convertjobs/ff169537-acd7-46f5-9cd6-73df860334f4/data/1.jpg
        ?Expires=1414048268&Signature=Y2xGOI0LI1tGPr2GMGrin~nobNN~4IxGPI6toaCWsb8yI1K01Iqpp96LJ9c5abBkQ7ETNW",
        "https://strage.com/mobile0001/convertjobs/ff169537-acd7-46f5-9cd6-73df860334f4/data/2.jpg
        ?Expires=1414048269&Signature=kIuvfTZyF1sl6RRqC4ZnB8URw87tVIXQUg7EP3mp7YwEYkHjkJVTfWkBPOPoYwtx4V4LhY",
        "https://strage.com/mobile0001/convertjobs/ff169537-acd7-46f5-9cd6-73df860334f4/data/3.jpg
        ?Expires=1414048269&Signature=AdWacUYsGTgX8j4M777V~yl2VNt3RjObnTctIf6AjwIR36bcrpWDVUmK6xFf1U5~8Ap7rj",
        "https://strage.com/mobile0001/convertjobs/ff169537-acd7-46f5-9cd6-73df860334f4/data/4.jpg
        ?Expires=1414048270&Signature=Js9xGmEhW6FriPc6yJnV3-W7Wia0PXCU3YJnbDaa7BhIQu1~7T-byV5CvSv~GSPMxLT8j5"
    ]
}
```

FIG. 5A

CLIENT INFORMATION 500

| CLIENT ID | PASSWORD | SCOPE |
|---|---|---|
| mobile0001 | ******** | MobilePrint |
| mobile0002 | ************** | MobilePrint |
| mobile0003 | ******** | MobilePrint |
| print0001 | ********* | IJPrint |
| convert0001 | ********* | SignedUrlUpload, SignedUrlDownload |

AUTHORIZATION TOKEN INFORMATION 510

| AUTHORIZATION TOKEN | EXPIRATION TIME | SCOPE | CLIENT ID |
|---|---|---|---|
| AT_000000 | 2014/09/30 11:00.00 | MobilePrint | mobile0001 |
| AT_000001 | 2014/12/30 12:00.00 | MobilePrint | mobile0002 |
| AT_000002 | 2014/9/30 13:00.00 | IJPrint | print0001 |
| AT_000003 | 2014/12/30 13:00.00 | MobilePrint | mobile0003 |
| AT_000004 | 2014/09/30 13:00.00 | MobilePrint | mobile0002 |
| AT_000005 | 2014/10/23 13:00.00 | SignedUrlAll, SignedUrlUpload, SignedUrlDownloadl | convert0001 |

SCOPE INFORMATION 600      601                                    602

| SCOPE | TEMPORARY URL VALIDITY PERIOD |
|---|---|
| SignedUrlUpload | 600 |
| SignedUrlDownload | 86400 |

FIG. 6B

EXAMPLE TEMPORARY URL 610 https://strage.com/mobile0001/convertjobs/ff169537-acd7-46f5-9cd6-73df860334f4/ticket/ticket.xml?Expires=1413942946&Signature=Aol4u3b7bODpkRinXZ-q8edlVSucYOFVqyOX8dWee~GFTw0pmnE~9UnlwvsJeR89tvTpL1prSfUZWmb-P9BHNza8I1LRzPqoiQHlz8n

FIG. 7A

TEMPORARY URL ACCESS CONTROL INFORMATION 700

701 702

| URL PATH PATTERN | ALLOWED REQUEST |
|---|---|
| /*/documents/* | GET, HEAD, OPTIONS, PUT, POST, PATCH, DELETE |
| /*/convertjobs/*/ticket/* | GET, HEAD, OPTIONS, PUT, POST, PATCH, DELETE |
| /*/convertjobs/*/index/* | GET, HEAD |
| /*/convertjobs/*/data/* | GET, HEAD |

FIG. 7B

FILE INFORMATION 710

711 712

| DATA URL | FILE PATH |
|---|---|
| https://strage.com/mobile0001/documents/45787890-34e4-32a4-8921-446655440000/45787890-34e4-32a4-8921-446655440000.docx | /data/mobile0001/documents/45787890-34e4-32a4-8921-446655440000/45787890-34e4-32a4-8921-446655440000.docx |
| https://strage.com/mobile0002/1dd3b180-57fe-11e4-8eca-0a85caef494e/convertjobs/ticket/ticket.xml | /data/mobile0002/1dd3b180-57fe-11e4-8eca-0a85caef494e/convertjobs/ticket/ticket.xml |
| https://strage.com/mobile0002/1dd3b180-57fe-11e4-8eca-0a85caef494e/convertjobs/index/index.jsonl | /data/mobile0002/1dd3b180-57fe-11e4-8eca-0a85caef494e/convertjobs/index/index.jsonl |
| https://strage.com/mobile0003/documents/33677112-6c5b-8d71-3452-128923434545/33677112-6c5b-8d71-3452-128923434545.xlsx | /data/mobile0003/documents/33677112-6c5b-8d71-3452-128923434545/33677112-6c5b-8d71-3452-128923434545.xlsx |
| https://strage.com/mobile0002/1dd3b180-57fe-11e4-8eca-0a85caef494e/convertjobs/data/1.jpg | /data/mobile0002/1dd3b180-57fe-11e4-8eca-0a85caef494e/convertjobs/data/1.jpg |

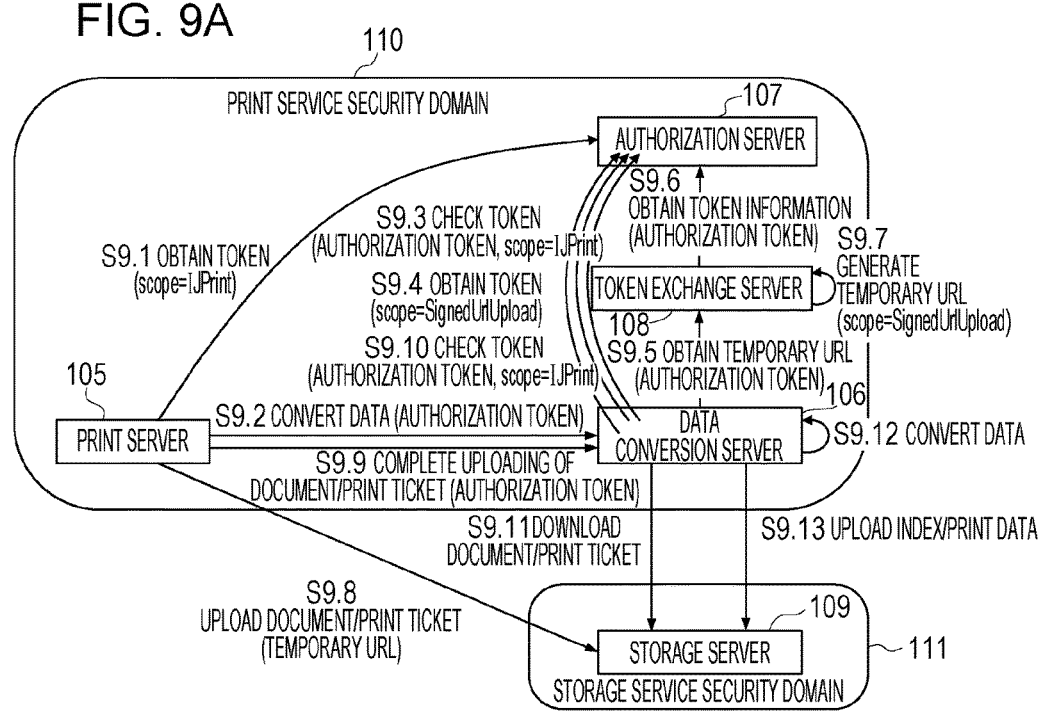
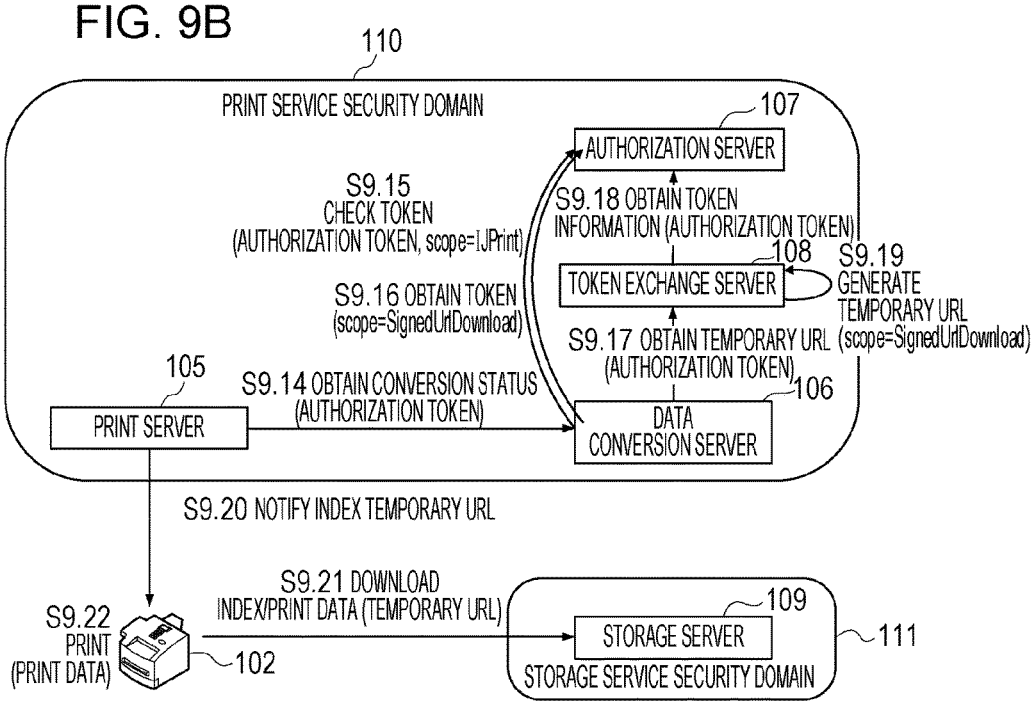

PRINTING SYSTEM, METHOD, AND PROGRAM FOR IMPLEMENTING SERVICE COORDINATION AMONG A PLURALITY OF SECURITY DOMAINS

TECHNICAL FIELD

A printing system, method, and program for implementing service coordination among a plurality of security domains.

BACKGROUND ART

A type of cloud computing in which servers provide services to clients has received attention in recent years. Cloud computing has a main feature that a great number of computing resources are used to perform data conversion and data processing in a distributed manner so that requests from a large number of clients are processed in parallel by means of distributed parallel processing. At present, there are too many vendors that provide various kinds of services by implementing Web services in a cloud computing environment that implements this kind of cloud computing. In the development of cloud services, providing new functions while exploiting services that have already been provided online provides an advantage in terms of development speed and development cost.

In cloud service coordination, due to the presence of a plurality of vendors that provide services, different security domains become an issue. In a case where a plurality of cloud services with different security domains are coordinated and used by a user, the client (user) needs to authenticate for each security domain, which can impair usability. One of the solutions is an authentication method in which, in coordination among services with different security domains, a temporary URL (or an authorization token) that is available only for a certain period of time is provided to a service user to implement Single Sign-On.

PTL 1 discloses a method in which authentication information from a client and a print data URL are saved and if authentication information input by a user matches the saved authentication information, print data is made available from the print data URL and is printed. There has hitherto been a method in which a URL is identified using authentication information.

CITATION LIST

Patent Literature

PTL 1 Japanese Patent Laid-Open No. 2002-183091

As a technique that adopts an authentication method described in the related art, cloud printing is conceivable in which a print service is used by a mobile terminal such as a smartphone and a document file is converted into print data and printed by a printer. In order to implement cloud printing, service coordination is contemplated which allows coexistence of storage services for file input and output and data conversion services for data conversion. In addition, a data conversion service uses a temporary URL for a storage service, and data is saved in a predetermined saving area of the storage service, thereby solving the issue of enabling coordination of services even with different security domains.

However, in the coordination of a data conversion server and a storage server which belong to different security domains, in some cases, a client terminal may be able to replace a temporary URL on the storage server by using authorization information (authorization token) for accessing the data conversion server. In these cases, a security problem arises in which the client terminal, which is located outside the data exchange server, might issue a temporary URL without authorization by using the authorization information and perform an unintended file operation on a file saved in the data conversion server.

It is an aspect of the claimed invention to establish a new authority to issue a temporary URL on a storage server, thereby preventing a client terminal from issuing a temporary URL by using authorization information for accessing a data conversion server.

SUMMARY OF INVENTION

A printing system according to an embodiment of the present invention is a printing system including a server system that holds a print service and a storage service, and a client, the printing system including issuance means for issuing authorization information necessary for use of a service without sending a request for authentication information to a request source that requests use of the service, conversion means for converting data to be printed into print data, and generation means for generating a first URL for identifying a saving area for the data to be printed or the print data, which is saved in the storage service with a security domain different from a security domain of the print service, wherein the conversion means, which has received first authorization information from the client, requests the issuance means to issue second authorization information in response to having confirmed that the print service is available to the client, based on the first authorization information, when the client is to perform an operation on the data to be printed or the print data, requests the generation means to generate a second URL for identifying a saving area where the data to be printed or the print data is saved by using the issued second authorization information, and transmits the second URL to the client.

Further features of the present invention will become apparent from the following description of exemplary embodiments with reference to the attached drawings.

BRIEF DESCRIPTION OF DRAWINGS

FIG. 4A illustrates a table structure managed by a data conversion server and an example index file.
FIG. 4B illustrates a table structure managed by the data conversion server and an example index file.
FIG. 4C illustrates a table structure managed by the data conversion server and an example index file.

FIG. 5A is a table structure managed by an authorization server.

FIG. 5B is a table structure managed by the authorization server.

FIG. 6A illustrates a table structure managed by a token exchange server and an example temporary URL.

FIG. 6B illustrates a table structure managed by the token exchange server and an example temporary URL.

FIG. 7A illustrates a table structure managed by a storage server.

FIG. 7B illustrates a table structure managed by the storage server.

FIG. 9A illustrates a printing flow from a print server.

FIG. 9B illustrates the printing flow from the print server.

DESCRIPTION OF EMBODIMENTS

The best mode for carrying out the present invention will be described hereinafter with reference to the drawings.

Exemplary Embodiment 1

System Configuration

Figure 1:
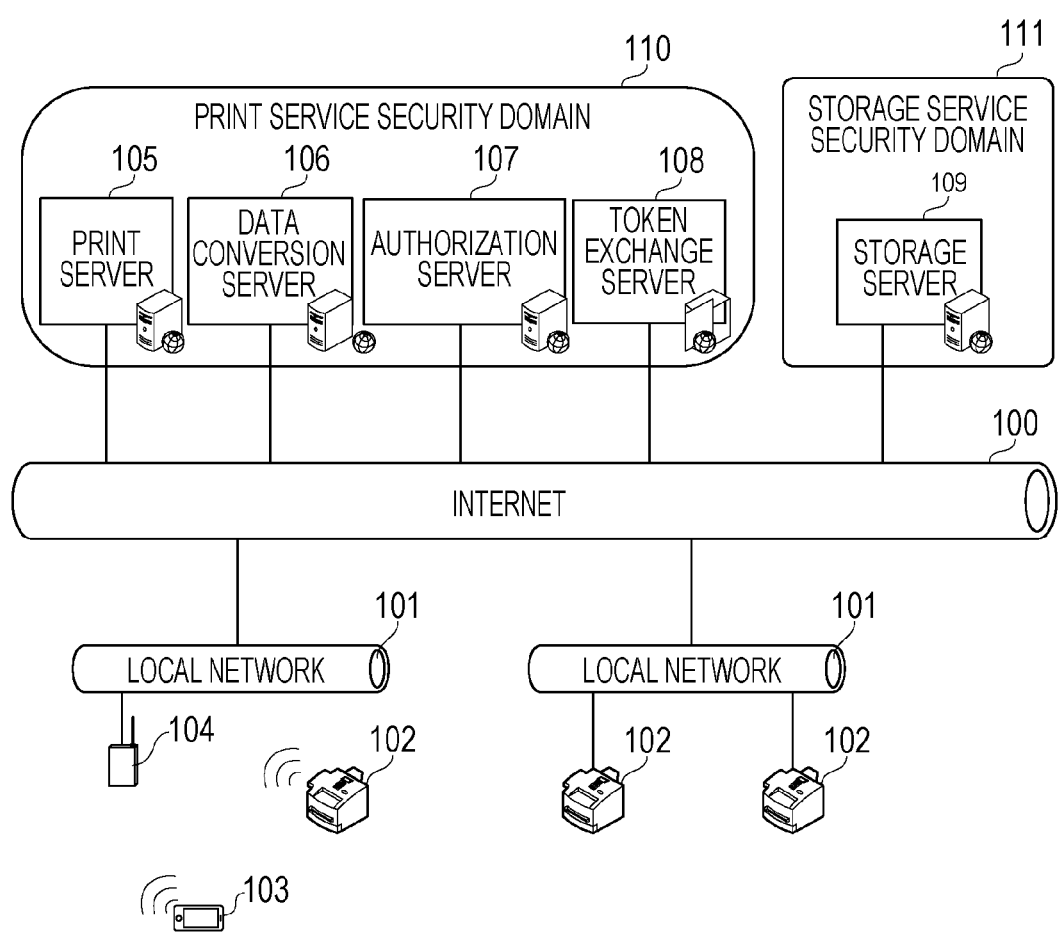
FIG. 1 is a system configuration diagram.

FIG. 1 is a diagram illustrating the overall configuration of a mobile printing system according to an embodiment of the present invention. In FIG. 1, it is assumed that a plurality of printers 102 and a plurality of mobile terminals 103 are connected via local networks 101. The printers 102 and the mobile terminals 103 are capable of accessing an Internetwork 100 via the local networks 101 to access servers 105 to 109. The mobile terminals 103 and the printers 102 are connected to a network via wired or wireless LANs. In this exemplary embodiment, a mobile terminal 103 is assumed to be connected to the network via a wireless LAN terminal 104 but is of course also assumed to be connected via a wireless network provided by a mobile data communication carrier. The wireless LAN terminal 104 is a base unit of a typical wireless LAN having a network router function, and provides a wireless LAN at home or in the office or the like.

The print server 105 converts accepted content data into print data by using the data conversion server 106, and prints the print data to the printer 102. Examples of means by which the print server 105 receives content data include receiving content data as a file attached to an email, receiving content selected through a UI on a mobile terminal 103, and receiving content on another content service. The data conversion server 106 converts content data transmitted from a mobile terminal 103 or the print server 105 to a data format which is readable by the printer 102. The authorization server 107 is a server for implementing OAuth. The authorization server 107 manages client information, and issues and manages an authorization token. The token exchange server 108 converts an authorization token issued by the authorization server 107 into a URL which can access the storage server 109. The storage server 109 is a server that performs file management. The storage server 109 accepts a file upload/download from a mobile terminal 103, a printer 102, the print server 105, or the data conversion server 106. While each of the servers 105 to 109 is made public on the Internet as a cloud service which is made redundant on a plurality of servers. In this exemplary embodiment, each server is represented by a single element, for simplicity of illustration.

A print service security domain 110 indicates a range accessible with an authorization token issued by the authorization server 107. The print server 105, the data conversion server 106, the authorization server 107, and the token exchange server 108 belong to the print service security domain 110. The storage server 109 belonging to a storage service security domain 111 is not accessible with the authorization token issued by the authorization server 107. A group of servers made up in each domain is referred to as a server system, and a server system in each domain holds services provided under the corresponding domain. For example, a server system belonging to a print service security domain holds a print service.

Hardware Configuration of Mobile Terminal 103

Figure 2A:
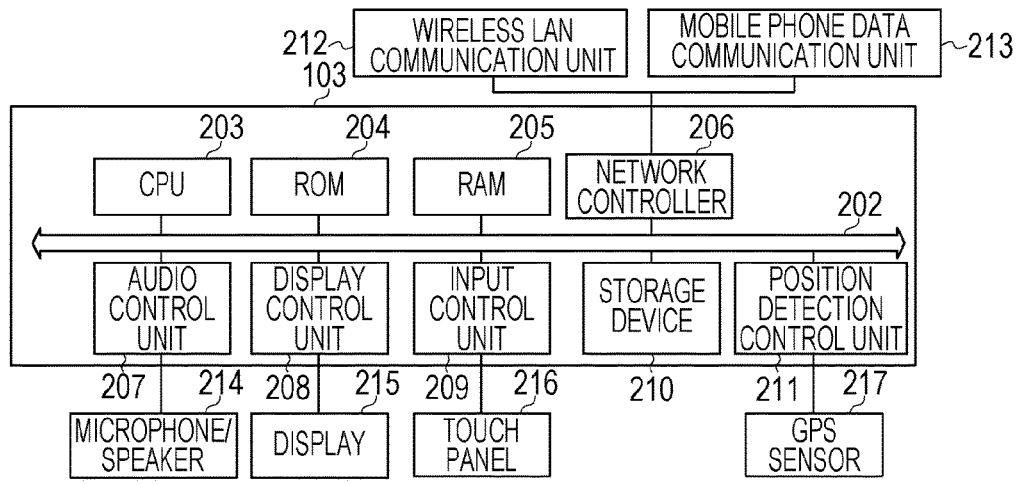
FIG. 2A is a hardware configuration diagram of each device.

FIG. 2A is a hardware configuration diagram of the mobile terminal 103. Constituent elements of hardware are connected to a system bus 202. An operating system, a telephone conversation application, and an application for controlling data communication are stored in a ROM 204, and are executed by a CPU 203. Examples of the application for controlling data communication include email software and a Web browser.

A RAM 205 is a working memory area for executing a program. The RAM 205 is also a memory for temporarily storing Web page data obtained by the Web browser from a Web server, authentication information for accessing a Web service, and the like. A storage device 210 is a non-volatile storage device, and stores various operation mode settings, an operating log, and so forth which need to be held even after the mobile terminal has been restarted.

A network controller 206 performs communication control of a wireless LAN communication unit 212 and a mobile phone data communication unit 213 for joining a network provided by a mobile carrier. In general, if it is possible to join a network of a wireless LAN, the network controller 206 prioritizes the connection of the wireless LAN. If the mobile terminal is outside the network area of the wireless LAN, the mobile terminal joins a wireless communication network provided by a mobile carrier. An audio control unit 207 is used mainly when the user is in telephone conversation after the telephone conversation application has been started. Audio data is input and output via a microphone/speaker 214, and the audio control unit 207 acts as an intermediary with a control program for the audio data.

A display control unit 208 controls information to be output on a display 215 of the mobile terminal. An input control unit 209 controls information specified by the user using a button on the mobile terminal or on a touch panel 216. By using the audio control unit 207, the display control unit 208, and the input control unit 209, an application on the mobile terminal provides network communication information and various kinds of information on the mobile terminal to the user. A position detection control unit 211 obtains position information on the mobile terminal from a GPS sensor 217, and provides the position information to the OS. The operations described above are controlled by the OS running on the CPU 203.

Hardware Configuration of Servers

Figure 2B:
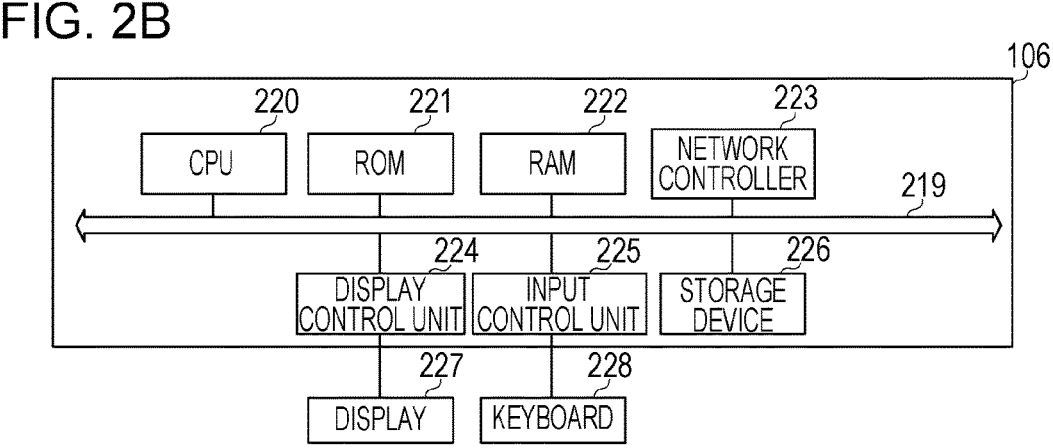
FIG. 2B is a hardware configuration diagram of each device.

FIG. 2B is a diagram illustrating an example of the hardware configuration of each of the servers 105 to 109. Needless to say, the present invention is applicable to any system composed of a single device or a plurality of devices as long as the system is capable of executing the functions of the present invention, unless otherwise stated. In addition, it goes without saying that the present invention is applicable to even a system in which a connection is made via a network such as a LAN or a WAN and processing is performed as long as the system is capable of executing the functions of the present invention, unless otherwise stated. In this exemplary embodiment, the description is given in the context in which individual constituent elements are connected to one another via a system bus 219.

Reference numeral 220 denotes a CPU that is a control device of an information processing apparatus. The CPU 220 executes an application program, a print driver program, and an operating system, which are stored in a storage device 226, and also executes a mobile printing system program of the present invention. Further, the CPU 220 performs control to temporarily store in a RAM 222 information necessary for executing a program, files, and so forth. Further, the CPU 220 opens a variety of windows registered in accordance with commands specified by a mouse cursor or the like (not illustrated) on a display 227, and executes a variety of types of data processing. Reference numeral 221 denotes a ROM that is a storage means. The ROM 221 stores therein programs, such as a basic I/O program, and various data used for document processing, such as font data and template data. Reference numeral 222 denotes a RAM that is a temporary storage means. The RAM 222 functions as a main memory, a working area, or the like of the CPU 220. Reference numeral 224 denotes a display control unit which controls information to be output on the display 227. Reference numeral 225 denotes an input control unit which controls information input from a keyboard 228 so that the information processing apparatus can exchange data with an external device via the input control unit 225. Reference numeral 226 denotes a storage device which is one of external storage means and serves as a large-capacity memory. The storage device 226 stores an application program, a print driver program, an OS, and so forth. Reference numeral 228 denotes a keyboard that is an instruction input means. The keyboard 228 is used by the user to input instructions or the like to a print server or the like. Reference numeral 227 denotes a display that is a display means. The display 227 is configured to display a command or the like input from the keyboard 228.

Hardware Configuration of Printer 102

Figure 2C:
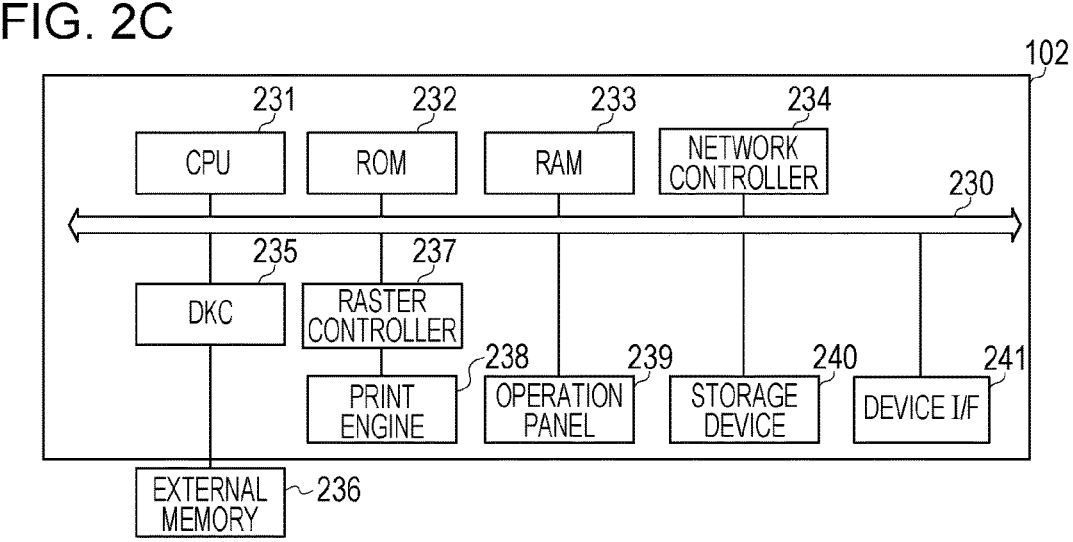
FIG. 2C is a hardware configuration diagram of each device.

FIG. 2C is a hardware configuration diagram of a printer 102. Constituent elements of hardware are connected to a system bus 230. Reference numeral 209 denotes a controller of the printer 102, which is a device that manages a control system of the printer. Reference numeral 231 denotes a CPU that controls the overall device. The CPU 231 collectively controls access to or from various devices connected to the system bus 230. This control is based on a control program or the like stored in a ROM 232 or based on a control program, resource data (resource information), or the like stored in an external memory 236 connected via a disk controller (DKC 235). Reference numeral 233 denotes a RAM that functions as a main memory, a working area, or the like of the CPU 231. The RAM 233 is configured such that an option RAM can be connected to an add-on port (not illustrated) to expand the memory capacity. Reference numeral 240 denotes an external storage means that functions as a large-capacity memory, which stores a program of a printing application 306 according to the present invention. Reference numeral 239 denotes an operation panel (operation unit) which accepts display of a screen and the user's operation instruction through a screen. Further, the operation panel 239 has arranged thereon buttons for performing operations such as setting the operation mode or the like of the printer 102, displaying the operation state of the printer 102, and specifying duplication, and a display unit such as a liquid crystal panel. Reference numeral 234 denotes a network interface card (NIC), and data is exchanged with an external device via the interface 234. Note that a print engine 238 illustrated in this drawing utilizes known printing technology, examples of which include, in a preferred embodiment system, an electrophotographic method (laser beam method), an inkjet method, and a sublimation (thermal transfer) method. A raster controller 237 is a controller that converts print data in PDL language or PDF language into image data. A device I/F 241 is an I/F connecting to an external device which is connectable by USB or the like.

Software Configuration of Data Conversion Server 106

Figure 3A:
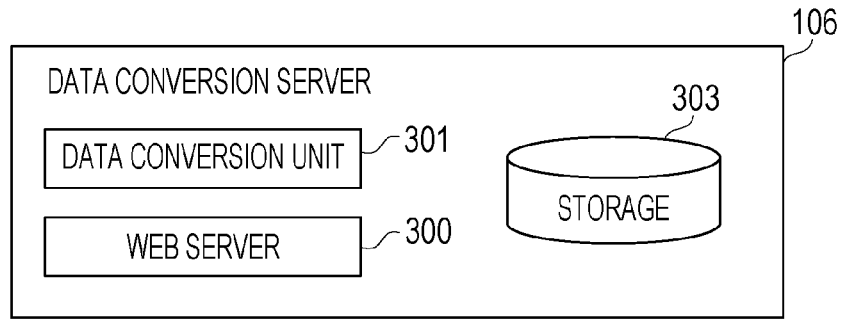
FIG. 3A is a software component configuration diagram of each device.

FIG. 3A is a software configuration diagram of the data conversion server 106. Note that each software module is stored in the storage device 226 illustrated in FIGS. 2A, 2B, and 2C and, as described above, is loaded onto the RAM 222 and executed by the CPU 220.

Reference numeral 300 denotes a Web server. The Web server 300 provides various interfaces of the data conversion server 106 described below, and verifies the validity of accepted information. Reference numeral 301 denotes a data conversion unit. The data conversion unit 301 receives a document file and a print ticket which are uploaded by a mobile terminal 103 or the print server 106 to the storage server 109, and converts the document file into a print data file which can be printed by a printer 102 in accordance with the print ticket. In this case, the document file is data to be printed, and data generated based on the document file is print data. The data conversion unit uploads the generated print data file and an index file that is a print data list to the storage server 109. Reference numeral 302 denotes a storage which stores information held by the data conversion server 106, which will be described with reference to FIG. 4A and FIG. 4B.

Software Configuration of Authorization Server 107

Figure 3B:
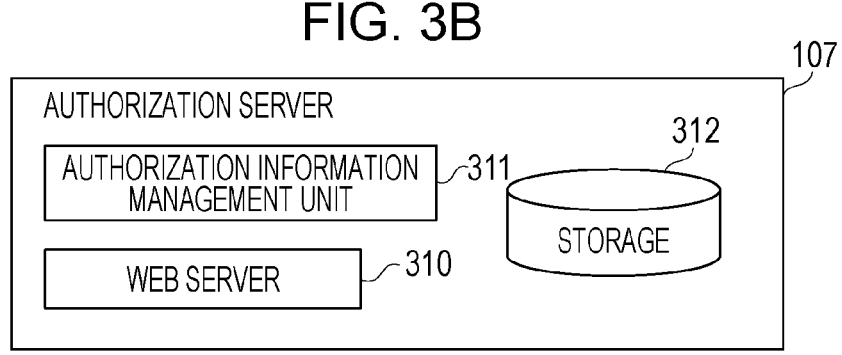
FIG. 3B is a software component configuration diagram of each device.

FIG. 3B is a software configuration diagram of the authorization server 107. Note that each software module is stored in the storage device 226 illustrated in FIGS. 2A, 2B, and 2C and, as described above, is loaded onto the RAM 222 and executed by the CPU 220.

Reference numeral 310 denotes a Web server. The Web server 310 provides various interfaces of the authorization server 107 described below, and verifies the validity of accepted information. Reference numeral 311 denotes an authorization information management unit. The authorization information management unit 311 manages client information 500 and authorization token information 510, which will be described with reference to FIG. 5A and FIG. 5B, and performs operations, such as issuing an authorization token, checking a scope, and checking expiration time, in accordance with a request accepted by the Web server 310. Reference numeral 312 denotes a storage which stores information held by the authorization server 107, which will be described with reference to FIG. 5A and FIG. 5B.

Software Configuration of Token Exchange Server 108

Figure 3C:
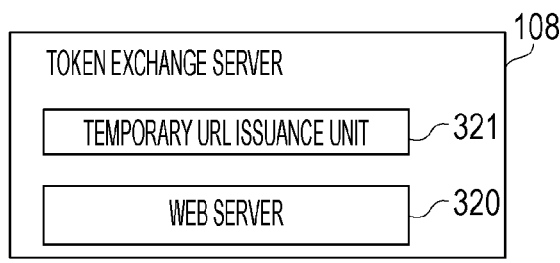
FIG. 3C is a software component configuration diagram of each device.

FIG. 3C is a software configuration diagram of the token exchange server 108. Note that each software module is stored in the storage device 226 illustrated in FIGS. 2A, 2B, and 2C and, as described above, is loaded onto the RAM 222 and executed by the CPU 220.

Reference numeral 320 denotes a Web server. The Web server 320 provides various interfaces of the token exchange server 108 described below, and verifies the validity of accepted information. Reference numeral 321 denotes a temporary URL issuance unit. The temporary URL issuance unit 321 manages scope information 600, which will be described with reference to FIG. 6A, and issues a temporary URL which can access the storage server 109 in accordance with a request accepted by the Web server 320. Reference numeral 322 denotes a storage which stores information held by the token exchange server 108, which will be described with reference to FIG. 6A.

Software Configuration of Storage Server 109

Figure 3D:
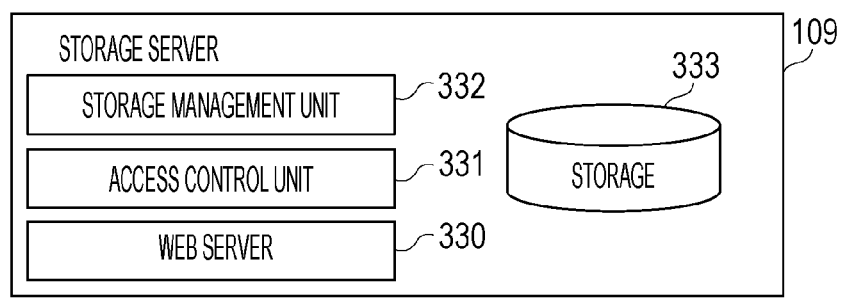
FIG. 3D is a software component configuration diagram of each device.

FIG. 3D is a software configuration diagram of the storage server 109. Note that each software module is stored in the storage device 226 illustrated in FIGS. 2A, 2B, and 2C and, as described above, is loaded onto the RAM 222 and executed by the CPU 220.

Reference numeral 330 denotes a Web server. The Web server 330 provides various interfaces of the storage server 109 described below, and verifies the validity of accepted information. Reference numeral 331 denotes an access control unit. The access control unit 331 manages temporary URL access control information 700, which will be described with reference to FIG. 7A, and determines whether or not to allow execution of a request accepted by the Web server 330, from the temporary URL access control information 700. A request allowed by the access control unit 331 to be executed is transmitted to a storage management unit 332, and a request for which it is determined that execution is rejected is treated as an error. The storage management unit 332 manages file information 710, which will be described with reference to FIG. 7B, and inputs and outputs a file requested to be uploaded. Reference numeral 332 denotes a storage which stores information held by the storage server 109, which will be described with reference to FIG. 7A and FIG. 7B, or stores, in a saving area corresponding to the temporary URL, a file received by the storage server 109.

Data in Data Conversion Server 106

FIG. 4A and FIG. 4B are data tables that the data conversion server 106 stores in a database which is an external memory. The data tables can also be configured to be stored not in an external memory of the data conversion server 106 but in another server configured to be capable of communication via the Internet 100 or the local network 101. The data tables held by the data conversion server 106 are constituted by document information 400 and data conversion information 410.

Each record of the document information 400 is generated by the data conversion unit 301 when a data conversion request is received, and is held in the storage 312. Reference numeral 401 denotes a document ID which is an identifier that uniquely identifies a document issued by the data conversion server 106 on the occasion of receiving a data conversion request. Reference numeral 402 denotes a client ID which is an identifier that uniquely identifies a client that has made a data conversion request. The data conversion server 106 obtains, from the authorization server 107, a client ID associated with an authorization token received as a parameter in the data conversion request, and holds the client ID as the client ID 402. A document URL 403 specifies an address indicating a location where a document file for which data conversion has been requested is saved, and is constituted by URLs on the storage service 109. The document URL 403 is generated by the data conversion server 106 when a data conversion request is received in such a manner that the URL path contains the document ID 401 and the client ID 402 so that the document URL 403 can be unique on the storage service 109, and is saved.

Each record of the data conversion information 410 is generated by the data conversion unit 301 when a data conversion request is received, and is held in the storage 312. Reference numeral 411 denotes a data conversion ID which is an identifier that uniquely identifies a data conversion process issued by the data conversion server 106 on the occasion of receiving a data conversion request. A client ID 412 and a document ID 413 have the same values as the client ID 402 and the document ID 401 in the document information 400 held by the data conversion server 106 when a data conversion request is received. A print ticket URL 414 specifies a URL on the storage service 109 at which a print ticket file for which data conversion has been requested is saved. The print ticket URL 414 is generated by the data conversion server 106 when a data conversion request is received in such a manner that the URL path contains the data conversion ID 411 and the client ID 412 so that the print ticket URL 414 can be unique on the storage service 109, and is saved. An index URL 415 specifies an address indicating a location where an index file generated by the data conversion server 106 when print data conversion is performed is saved, and is constituted by URLs on the storage service 109. The index URL 415 is generated by the data conversion server 106 when print data conversion is completed in such a manner that the URL path contains the data conversion ID 411 and the client ID 412 so that the index URL 415 can be unique on the storage service 109, and is saved. A status 416 indicates the state of print data conversion of the data conversion server 106, and is updated by the data conversion server 106 in accordance with the state of print data conversion. The status 416 includes "standby" and "already converted".

FIG. 4C illustrates an example index file generated by the data conversion server 106 when print data conversion is performed. An index file is in JSON format, and describes a list of temporary URLs of print data. FIG. 4C illustrates an example in which temporary URLs of Jpeg images for four pages are described. A printer 102 and a mobile terminal 103 download and print, in sequence, the pieces of print data indicated by the temporary URLs described in the index file.

Data in Authorization Server 107

FIG. 5A and FIG. 5B are data tables that the authorization server 107 stores in a database which is an external memory. The data tables can also be configured to be stored not in an external memory of the authorization server 107 but in another server configured to be capable of communication via the Internet 100 or the local network 101. The data tables held by the authorization server 107 are constituted by client information 500 and authorization token information 510.

The client information 500 in FIG. 5A has registered therein information on clients that can access the servers 105 to 109 belonging to the print service security domain 110. In this exemplary embodiment, the client information has registered therein the mobile terminals 103, the print server 105, and the data conversion server 106. Reference numeral 501 denotes a client ID which is an identifier that uniquely identifies a client. In this exemplary embodiment, the client IDs of the plurality of mobile terminals 103 are defined and registered as mobile0001 to mobile0002, and the client ID of the print server 105 is defined and registered as print0001. The client ID of the data conversion server 106 is defined and registered as convert0001. Reference numeral 502 denotes a password for determining the authenticity of a client, and the authorization server 107 identifies a client when its client ID 501 and password 502 match. Reference numeral 503 denotes an OAuth scope which indicates a range accessible with an authorization token issued by the authorization server 107. Types of the scope 503 in this exemplary embodiment are defined as MobilePrint, IJPrint, SignedUrlUpload, and SignedUrlDownload.

The MobilePrint scope is a scope necessary for a mobile terminal 103 to access an interface of the data conversion server 106. The IJPrint scope is a scope necessary for the print server 105 to access an interface of the data conversion server 106. The SignedUrlUpload scope is a scope that the data conversion server 106 uses to issue a temporary URL for allowing a mobile terminal 103 or the print server 105 to upload a file to the storage server 109. The SignedUrlDownload scope is a scope that the data conversion server 106 uses to issue a temporary URL for allowing a mobile terminal 103 or the print server 105 to download a file from the storage server 109. The data conversion server 106 whose client ID 501 is convert0001 is associated with both the SignedUrlUpload scope and the SignedUrlDownload scope.

In the authorization token information 510 in FIG. 5B, each record is registered by the authorization information management unit 311 when the Web server 310 accepts a token obtaining request. Reference numeral 511 denotes an identifier capable of uniquely identifying an authorization token, and the identifier is generated and registered by the authorization information management unit 311. Reference numeral 512 denotes the expiration time of an authorization token, and a value at a certain period of time after the authorization information management unit 311 receives a token obtaining request is registered. The authorization token 511 that has passed the expiration time 512 is invalid. A scope 513 is a scope available to the authorization token 511, and a scope passed in a token obtaining request delivered to the authorization server 107 is registration. In a client ID 514, a client ID passed in a token obtaining request delivered to the authorization server 107 is registered. As described above, various kinds of information relating to authentication information and authorization information are associated with one another.

Data in Token Exchange Server 108

FIG. 6A is a data table that the token exchange server 108 stores in an external memory. The data table can also be configured to be stored not in an external memory of the token exchange server 108 but in another server configured to be capable of communication via the Internet 100 or the local network 101. The data table held by the token exchange server 108 is constituted by scope information 600.

The scope information 600 in FIG. 6A is constituted by a scope 601 and a temporary URL expiration time 602. The scope 601 is a scope within which a temporary URL is issuable, and, in this exemplary embodiment, SignedUrlUpload and SignedUrlDownload are registered. The expiration time after which the corresponding temporary URL will be no longer available is registered as the temporary URL expiration time 602.

FIG. 6B illustrates an example temporary URL issued by the token exchange server 108. The token exchange server 108 assigns query parameters to a URL received in a temporary URL issuance request from the data conversion server 106 to generate a temporary URL. As parameters for the temporary URL, "Expires", which indicates the expiration time, and "Signature", which is a signature for checking the effectiveness of the temporary URL, are assigned by the token exchange server 108. "Signature" provides a signature of a URL with a certificate that is held commonly in the token exchange server 108 and the storage server 109. Such a signature enables the storage server 109 to verify the effectiveness of a temporary URL generated by the token exchange server 108. As a temporary URL issuance means, there is a method in which the token exchange server 108 requests the storage server 109 to issue a temporary URL and the storage server 109 generates a temporary URL.

Alternatively, as parameters for the temporary URL, policy information obtained by signing HTTP methods (GET, HEAD, OPTIONS, PUT, POST, PATCH, DELETE) and a connection permission IP address with a certificate may be assigned. This enables the storage server 109 to verify the effectiveness of the request by determining a match between the request information and the policy information. Limiting HTTP methods or connection source IP addresses that can be connected through the temporary URL can reduce the unauthorized use of the temporary URL.

Data in Storage Server 109

FIG. 7A and FIG. 7B are data tables that the storage server 109 stores in an external memory. The data tables can also be configured to be stored not in an external memory of the storage server 109 but in another server configured to be capable of communication via the Internet 100 or the local network 101. The data tables held by the storage server 109 are constituted by temporary URL access control information 700 and file information 710.

The temporary URL access control information 700 in FIG. 7A is used by the access control unit 331 to determine whether or not to process a request accepted by the Web server 330. A URL path pattern 701 is represented by a regular expression of a URL path, and an allowed request 702 specifies HTTP allowed methods. The access control unit 331 identifies a URL path pattern 701 that matches the URL path in a HTTP request accepted by the Web server 330, and authorizes the process in a case where the accepted HTTP methods are included in the allowed request 702. If the request is not included in the allowed request 702, an error is set. In this exemplary embodiment, in the case of a document URL path pattern (/*/documents/*) and a print ticket URL path pattern (/*/convertjobs/*/ticket/*) as the temporary URL access control information 700, the HTTP methods for upload/download are allowed. In contrast, in the case of an index URL path pattern (/*/convertjobs/*/index/*) and a print data URL path pattern (/*/convertjobs/*/data/*), only the HTTP methods for download are allowed.

The file information 710 in FIG. 7B is information on files saved in the storage server 109, and is managed by the storage management unit 332. A data URL 411 specifies a URL capable of uniquely identifying a file saved in the storage server 109. A file path 712 specifies a file path in the storage 333, which indicates a storage location of a file managed by the storage management unit 332. The storage management unit 332 creates, in the "/data" directory, a directory having the same hierarchical structure as the sub-path of the data URL 411, and stores the file. By making a request to the data URL 411, it is possible to perform a file operation on the storage 333. For example, a request for the HTTP GET method is made to the data URL 411, thereby making it possible to download the corresponding file. A request for the HTTP PUT method, accompanied by a file, is made to the data URL 411, thereby making it possible to upload and save the file. A request for the HTTP DELETE method is made to the data URL 411, thereby making it possible to delete the corresponding file.

Printing Flow from Mobile Terminal 103

Figure 8A:
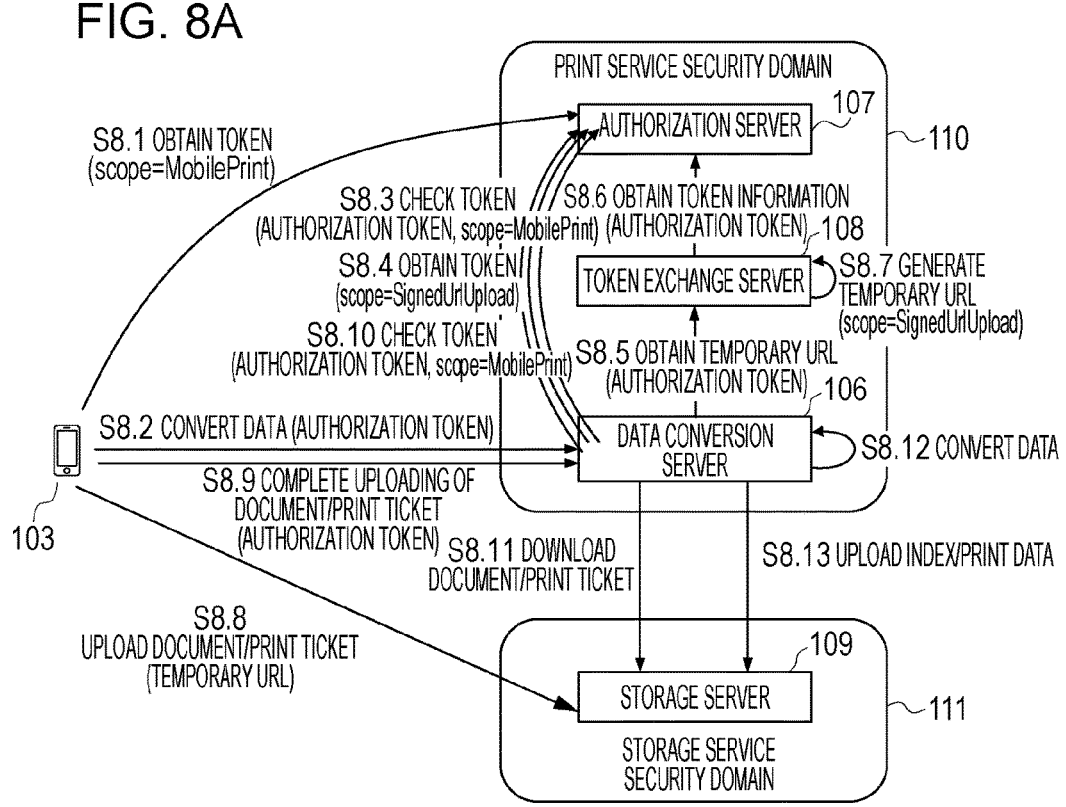
FIG. 8A illustrates a printing flow from a mobile terminal.
Figure 8B:
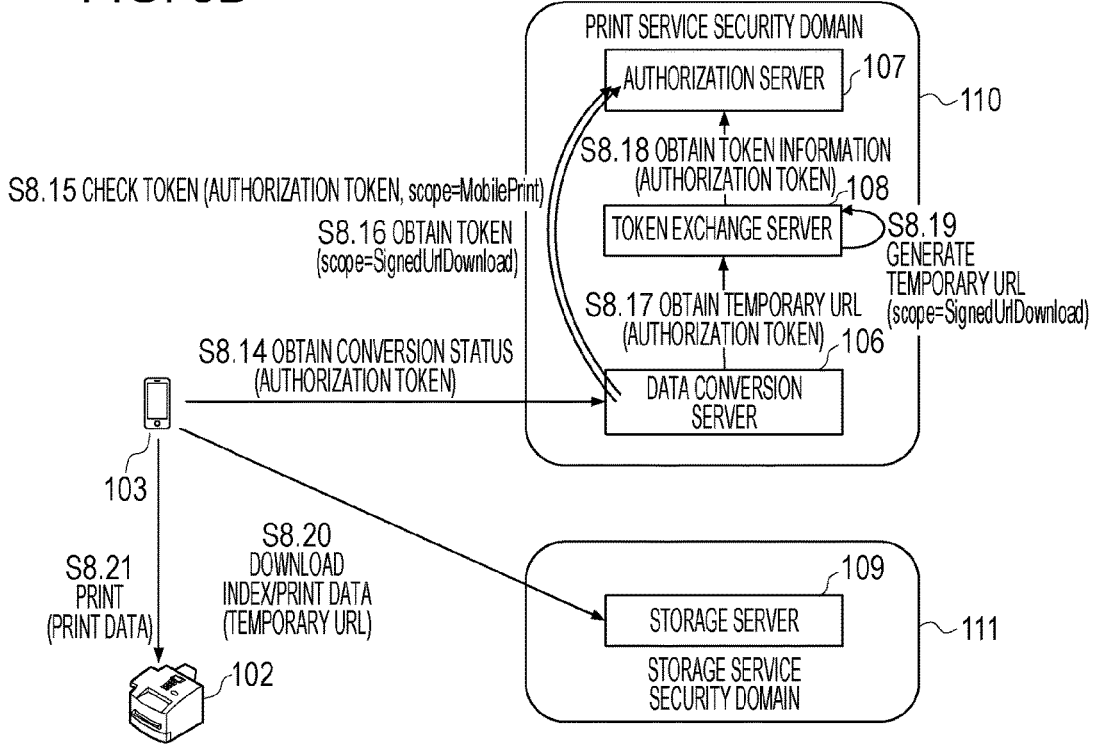
FIG. 8B illustrates the printing flow from the mobile terminal.

FIG. 8A and FIG. 8B illustrate a process flow in which a mobile terminal 103 converts a document into print data using the data conversion server 106 and prints the print data to the printer 102. In S8.1, the mobile terminal 103 makes a token obtaining request to the authorization server 107, and obtains an authorization token. The mobile terminal 103 specifies, in the token obtaining request (S8.1), the client ID held therein (for example, mobile0001), the password, and the MobilePrint scope as parameters. The authorization server 107, which has accepted the token obtaining request (S8.1), confirms that the parameters in the token obtaining request (S8.1) match the client ID 501 and the password 502 and that the scope 503 includes MobilePrint, thereby identifying a client. Then, the authorization server 107 generates an authorization token 511, and registers, as a record in the authorization token information 510, the expiration time and the client ID and scope accepted as parameters in the token obtaining request (S8.1). Further, the authorization server 107 returns the generated authorization token 511 to the mobile terminal 103.

In S8.2, the mobile terminal 103 makes a data conversion request to the data conversion server 106 by using the authorization token obtained in S8.1 as a parameter. In S8.3, the data conversion server 106 makes a token check request to the authorization server 107 by specifying the authorization token as a parameter in the data conversion request in S8.2 and the MobilePrint scope. The authorization server 107, which has accepted the token check request (S8.3), searches for an authorization token 511 and a scope 513 that match the authorization token specified as a parameter and the MobilePrint scope, and identifies a record from the authorization token information 510. If the authorization server 107 has succeeded that the expiration time 512 of the record in the authorization token information 510, which has been successfully identified, is later than the current time, the authorization server 107 returns the identified record in the authorization token information 510 as a response. If the expiration time 512 of the identified record in the authorization token information 510 has expired or the authorization server 107 has failed to identify a record in the authorization token information 510, the authorization server 107 makes a response indicating that the authorization token accepted in the token check request (S8.3) is invalid.

In S8.4, as a result of the token check request (S8.3), if the authorization token is valid and the record in the authorization token information 510 has been received, the data conversion server 106 registers the record in the document information 400, or the data conversion information 410, and makes a token obtaining request to the authorization server 107 to obtain an authorization token. Here, the record that the data conversion server 106 registers in the document information 400 contains a document ID issued by the data conversion server 106, the client ID received in response to the token check request (S8.3), and a document URL on the storage service 109 which is generated based on the document ID and the client ID. As in FIG. 4A, the path of the document URL includes the text "documents". The record that the data conversion server 106 registers in the data conversion information 410 contains a data conversion ID issued by the data conversion server 106, the client ID and document ID registered in the document information 400, and a print ticket URL and an index URL on the storage service 109 which are generated based on the data conversion ID and the client ID. As in FIG. 4B, the path of the print ticket URL includes the text "convertjobs" and "tickets". Further, the path of the index URL includes the text "convertjobs" and "index". The data conversion server 106 specifies, in the token obtaining request (S8.4), the client ID (convert0001) of the data conversion server 106, which is held in advance, the password, and the SignedUrlUpload scope as parameters, and transmits the token obtaining request. The client identifying method and the authorization token issuing method of the authorization server 107, which has accepted the token obtaining request (S8.4), are similar to those in S8.1.

In S8.5, the data conversion server 106 makes a temporary URL obtaining request to the token exchange server 108 by using, as parameters, the authorization token obtained by the token obtaining request (S8.4) and the generated document URL 403 and print ticket URL 414. In S8.6, the token exchange server 108 makes a token information obtaining request to the authorization server 107 by using, as a parameter, an authorization token received as a parameter in the temporary URL obtaining request (S8.5). The authorization server 107, which has accepted the token information obtaining request (S8.6), identifies, from the authorization token information 510, a record having an authorization token 511 that matches the authorization token received as a parameter. Then, if the expiration time 512 is later than the current time, the authorization server 107 returns the scope. The scope returned here is the SignedUrlUpload scope specified in the token obtaining request in S8.4. If the authorization token information 510 has no record that matches the authorization token as a parameter or if the expiration time 512 of the identified record is earlier than the current time, the authorization server 107 returns an error.

In S8.7, if the token exchange server 108 has successfully confirmed that the response to the token information obtaining request (S8.6) is the SignedUrlUpload scope, the token exchange server 108 uses the document URL and print ticket URL received in the temporary URL obtaining request to generate their respective temporary URLs. The temporary URLs generated here are URLs available until the end of the temporary URL validity period 602 corresponding to the scope 501 registered in the scope information 600 which specifies SignedUrlUpload. In addition, assigning, as policy information, the connection source IP address of the mobile terminal 103 to a temporary URL as a parameter can limit a connection source IP address that can be connected through the temporary URL only to the mobile terminal 103. A limitation on a connection source IP address that can be connected through the temporary URL can reduce the unauthorized use of the temporary URL. The token exchange server 108 returns the generated temporary URL of the document URL and the generated temporary URL of the print ticket URL to the data return server 106 in response to the temporary URL obtaining request (S8.5). Then, the data conversion server 106 returns the received temporary URL of the document URL, the received temporary URL of the print ticket URL, and the generated data conversion ID to the mobile terminal 103 in response to the data conversion request (S8.2).

In S8.8, the mobile terminal 103 makes a request for the HTTP PUT method by attaching a document file and a print ticket file to the temporary URL of the document URL and the temporary URL of the print ticket URL, which have been received in response to the data conversion request (S8.2), respectively. The storage server 109, which has accepted a document/print ticket upload request (S8.8), determines the approval/rejection of the request on the basis of the temporary URL access control information 700. In S8.8, the document URL has been generated so as to include "documents", which matches "/*/documents/*" in the URL path pattern 701, resulting in PUT being permitted in the allowed request 702. In S8.8, furthermore, the print ticket URL has been generated so as to include "convertjobs" and "ticket", which match "/*/convertjobs/*/ticket/*" in the URL path pattern 701, resulting in PUT being permitted in the allowed request 702. Accordingly, the storage server 109 permits the acceptance of the document/print ticket upload request (S8.8).

Here, if the policy information of the temporary URL accepted by the storage server 109 has a connection source IP address assigned thereto, access is permitted only when the connection source IP address matches the connection source IP address of communication data for which a request has been accepted by the storage server 109. If the connection source IP address assigned to the policy information of the accepted temporary URL does not match the connection source IP address of the communication data, the storage server 109 considers the request as an error. The process in which the storage server 109 determines accessibility by using the connection source IP address of the temporary URL is performed in a way similar to that when a request is accepted through a temporary URL in S8.20, S9.8, and S9.21 described below. The storage server 109, which has permitted the acceptance of the document/print ticket upload request (S8.8), saves the files attached to the request in the file path 712. Then, the storage server 109 registers, in the file information 710, the data URL in the document/print ticket upload request (S8.8) and the file path in which the attached files are saved.

In S8.9, when uploading of the document/print ticket (S8.8) to the storage server 109 is completed, the mobile terminal 103 notifies the data conversion server 106 of the completion of uploading of the document/print ticket. The mobile terminal 103 specifies, in a document/print ticket upload completion request (S8.9), the authorization token obtained in S8.1 and the data conversion ID obtained in S8.2 as parameters. In S8.10, the data conversion server 106 makes a token check request to the authorization server 107 by using, as parameters, the authorization token passed as a parameter in the document/print ticket upload completion request (S8.9) and the MobilePrint scope. The token check method of the authorization server 107, which has accepted the token check request (S8.10), is similar to that in S8.3.

In S8.11, first, the data conversion server 106 searches the data conversion information 410 for a data conversion ID 411 that matches the data conversion ID passed as a parameter in the document/print ticket upload completion request (S8.9). Then, the data conversion server 106 identifies the print ticket URL 414 and the document ID 413 in the record found as a result of the search for the data conversion ID 411. The data conversion server 106 further identifies a document URL 403 from the document information 400 by using the document ID 413. The data conversion server 106 makes a document/print ticket download request (HTTP GET) to the identified document URL 403 and print ticket URL 414. If no data conversion ID is found in the data conversion information 410 for which the document/print ticket upload completion request (S8.9) has been made by the data conversion information 410, the data conversion server 106 returns an error in response to the request in S8.9. The storage server 109, which has accepted the document/print ticket download request, identifies a data URL 711 from the accepted URL in the file information 710, and returns the files saved in the file path 712 as a response. Here, the data conversion server 106 has held therein an authorization token for the storage server 109, and assigns the authorization token to a request made to the storage server 109. Accordingly, the storage server 109 permits the document/print ticket download request from the data conversion server 106 as ineligible for access control using the temporary URL access control information 700.

In S8.12, the data conversion server 106 performs data conversion using the document file and the print ticket file obtained from the storage server 109 in response to the document/print ticket download request (S8.11). The data conversion server 106 converts the document file into a print data file in accordance with the print ticket. The print data file generated by the data conversion server 106 may be a single file or a set of a plurality of files depending on the document and the print ticket. When data conversion is completed, the data conversion server 106 updates the status in the record in the data conversion information 410 which is identified in S8.11 to "already converted".

In S8.13, the data conversion server 106 uploads (HTTP PUT) the one or plurality of print data files generated in S8.12, whose URL path includes "convertjobs" and "data", to the storage server 109. Here, the data conversion server 106 also makes the URL path of the print data file(s) include the client ID 412 and the data conversion ID 411 in the record in the data conversion information 410 which is identified in S8.11. Then, the data conversion server 106 generates an index file that is a list of temporary URLs of the print data URL illustrated in the example in FIG. 4B by using the uploaded print data URL. The method of generating a temporary URL of a print data URL using the data conversion server 106 is similar to the temporary URL generation flow explained in S8.4 to 8.7 described above although not illustrated in the drawing, and SignedUrl-Download is designated as the scope. The storage server 109 generates a temporary URL with a long temporary URL validity period 602 since the SignedUrlDownload scope is designated. The data conversion server 106 uploads (HTTP PUT) the index file, whose URL path includes "convertjobs" and "index", to the storage server 109. Here, the data conversion server 106 also makes the URL path of the index file include the client ID 412 and the data conversion ID 411 in the record in the data conversion information 410 which is identified in S8.11. The storage server 109, which has accepted an index/print data upload request, saves the index file and the print data file in the file path generated in accordance with the URL path, and registers the record in the file information 710.

Next, a method for obtaining print data will be described with reference to FIG. 8B. In S8.14, the mobile terminal 103 makes a conversion status obtaining request to the data conversion server 106. The mobile terminal 103 specifies, as parameters in the conversion status obtaining request (S8.14), the authorization token obtained in S8.1 and the data conversion ID obtained in S8.2 as parameters. In S8.15, the data conversion server 106, which has accepted the conversion status obtaining request (S8.14), makes a token check request for the authorization token specified by the parameters to the authorization server 107. The token check made by the authorization server 107 is similar to that in S8.3 described above.

Then, the data conversion server 106 searches the data conversion information 410 for a data conversion ID 411 that matches the data conversion ID specified by the parameters in the conversion status obtaining request (S8.14), and checks the status 416 in the record that matches. The data conversion server 106 returns the status 416 in response to the conversion status obtaining request (S8.14) if the status 416 does not indicate "already converted". After making the document/print ticket upload completion request (S8.9), the mobile terminal 103 repeatedly makes a conversion status obtaining request (8.14) until the status indicates "already converted" in response to the conversion status obtaining request (8.14). The repeatedly made request is performed via regular communication using polling.

In S8.16, if the status 416 of the data conversion ID specified in the conversion status obtaining request (S8.14) indicates "already converted", then in S8.15 to S8.19, the data conversion server 106 generates a temporary URL of the index URL 415. The temporary URL generation flow in S8.15 to S8.19 is similar to the temporary URL generation flow explained in S8.4 to 8.7 described above, and SignedUrlDownload is designated as the scope. The index URL used here is the index URL 415 in a record that matches the data conversion ID specified by the parameter in the conversion status obtaining request (S8.14) described above.

In S8.15 to S8.19, the data conversion server 106, which has obtained the temporary URL of the index URL 415, returns the temporary URL of the index URL 415 obtained in response to S8.14 and the status 416 ("already converted"). In S8.20, the client terminal 103 downloads (HTTP GET) the index file from the temporary URL of the index URL 415 obtained in the conversion status obtaining request (S8.14). The storage server 109, which has accepted the index download request (S8.20), determines access approval/rejection using the temporary URL access control information 700. The index URL path includes "convertjobs" and "index", which match "/*/convertjobs/*/index/*" in the URL path pattern 701. Since the allowed request 702 includes GET, the storage server 109 permits the index download request (S8.20).

The storage server 109 identifies the file path 712 corresponding to the requested index URL from the file information 710 in response to the index download request (S8.20), and returns the index file saved in the file path 712. The client terminal 103, which has received the index file, downloads (HTTP GET) print data from a temporary URL of one or a plurality of print data URLs described in the index file. The storage server 109, which has accepted the print data download request (S8.20), determines access approval/rejection using the temporary URL access control information 700. The index URL path includes "convertjobs" and "data", which match "/*/convertjobs/*/data/*" in the URL path pattern 701. Since the allowed request 702 includes GET, the storage server 109 permits the print data download request (S8.20). The storage server 109 identifies the file path 712 corresponding to the requested print data URL from the file information 710 in response to the print data download request (S8.20), and returns the print data file saved in the file path 712. In S8.21, the client terminal 103 transmits the downloaded one or plurality of pieces of print data to the printer 102 for printing.

Printing Flow from Print Server 105

FIG. 9A and FIG. 9B illustrate a process flow in which the print server 105 converts a document into print data using the data conversion server 106 and prints the print data at the printer 102. In this manner, a client that is the source of a request for data conversion in the claimed invention is as diverse as a user terminal, a server, and so forth. The process flow of S9.1 to S9.19 is a process flow in which the print server 105 plays the role of the client terminal 103 in S8.1 to S8.19 described above. In addition, the scope for which the print server 105 makes a request to the data conversion server 106 is now IJPrint. The other portions are similar and are not described. In this manner, a different scope is set for each client, thereby making it possible to differentiate clients from each other. However, no client is assigned a scope for URL generation, thereby ensuring security.

In S9.20, the print server 105 notifies the printer 102 of the temporary URL of the index URL 415 obtained in the conversion status obtaining request (S9.14).

In S9.21, the method for downloading an index file and print data from the storage server 109 by using the temporary URL of the index URL 415, and the access control method performed by the storage server 109 are similar to those in S8.20 described above. In S9.22, the printer 102 prints the print data downloaded in S9.21.

As described above, the scopes (MobilePrint, IJPrint) for allowing a mobile terminal 103 or the print server 105 to access the data conversion server 106 and the scopes (SignedUrlUpload, SignedUrlDownload) necessary for the issuance of a temporary URL are separated from each other, thereby enabling only the data conversion server 106 to obtain a temporary URL. The issuance of a temporary URL is permitted only by the data conversion server 106, thereby enabling secure provision of a temporary URL to an external service. In addition, the scopes necessary for the issuance of a temporary URL are divided into a scope for uploading purposes (SignedUrlUpload) and a scope for downloading purposes (SignedUrlDownload), and a temporary URL issued with the scope for uploading purposes is allowed to be uploaded only, whereas a temporary URL issued with the scope for downloading purposes is allowed to be downloaded only. This can prevent unauthorized file operations (upload, download, update, deletion) using a temporary URL.

Other Exemplary Embodiments

The present invention can also be implemented by the execution of the following process: a process for supplying software (program) implementing the functions of the exemplary embodiment described above to a system or an apparatus via a network or various storage media and reading and executing the program by using a computer (or a CPU, an MPU, or the like) of the system or apparatus.

The present invention is not limited to the foregoing embodiment, and various changes and modifications can be made without departing from the spirit and scope of the present invention. Therefore, to apprise the public of the scope of the present invention, the following claims are provided.

By establishing a new authority to issue a temporary URL on a storage server, it is possible to prevent a client terminal from issuing a temporary URL by using authorization information for accessing a data conversion server.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2014/081854, filed Dec. 2, 2014, which is hereby incorporated by reference herein in its entirety.

What is claimed is:
1. A printing system that includes a first server system, a second server system, and a client,
the first server system being configured to provide a print service, and including an authorization server, a token exchange server and a data conversion server, the second server system being configure to provide a storage service and belonging to a security domain different from a security domain to which the first server system belongs, the client belonging to a security domain different from the security domain to which the first server system belongs and from the security domain to which the second server system belongs, the authorization server comprising:

at least a processor and at least a memory coupled to the at least the processor and having stored thereon instructions, when executed by the at least the processor, and cooperating to act as:

an association unit configured to associate first authority information for accessing the data conversion server with identification information of the client, and configured to associate second authority information for executing a specific operation on the second server system with identification information of the data conversion server;

a first issuance unit configured to, after verification of the first authority information received from the client, issue a first authorization token that is necessary for accessing the data conversion server, to the client to which a first authority has been granted according to the first authority information;

a second issuance unit configure to, after verification of the first authorization token, which is received from the data conversion server, and the second authority information, issue a second authorization token that is necessary for causing the token exchange server to issue a temporary URL to the data conversion server to which a second authority has been granted according to the second authority information;

the data conversion server comprising:

at least a processor and at least a memory coupled to the at least the processor and having stored thereon instructions, when executed by the at least the processor, and cooperating to act as:

a conversion unit to convert data to be printed into print data; and the token exchange server comprising:

at least a processor and at least a memory coupled to the at least the processor and having stored thereon instructions, when executed by the at least the processor, and cooperating to act as:

a generation unit configured to generate the temporary URL, after receipt of the second authorization token from the data conversion server and verification, by the authorization server, of the second authorization token;

the client comprising:

at least a processor and at least a memory coupled to the at least the processor and having stored thereon instructions, when executed by the at least the processor, and cooperating to act as:

a transmission unit configured to transmit requests using the temporary URL to the second server system after receipt of the temporary URL.

2. The printing system according to claim 1, wherein in a case where second authority information received from the data conversion server is authority information for causing an operation of uploading the data to be printed to the second server system to be performed, the generation unit generates a temporary URL for performing uploading, and, in a case where the second authority information is the authority information indicating that an operation of downloading the print data is performed, the generation unit generates a temporary URL for performing downloading.

3. The printing system according to claim 1, wherein the first issuance unit, which has received authentication information and a scope and has been requested by the client to issue the first authorization token, confirms that the received authentication information matches authentication information registered in a database, then checks whether or not information related to the received scope is included in a scope associated with the authentication information, and issues the first authorization token in response to having successfully confirmed that the information related to the received scope is included in the scope associated with the authentication information.

4. The printing system according to claim 3, wherein a scope associated with authentication information on the data conversion server includes both the scope indicating that the operation of uploading the data to be printed is performed, and the scope indicating that the operation of downloading the print data is performed.

5. The printing system according to claim 1, wherein the data conversion server transmits an error to the client in a case where the data conversion server has failed to confirm that the print service is available to the client, based on the first authorization token.

6. A method executable by a printing system that includes a first server system, a second server system, and a client, the first server system being configured to provide a print service, and including an authorization server, a token exchange server and a data conversion server, the second server system being configure to provide a storage service and belonging to a security domain different from a security domain to which the first server system belongs, the client belonging to a security domain different from the security domain to which the first server system belongs and from the security domain to which the second server system belongs, the method comprising:

associating first authority information for accessing the data conversion server with identification information of the client, and configured to associate second authority information for executing a specific operation on the second server system with identification information of the data conversion server;

first issuing, after verification of the first authority information received from the client, a first authorization token that is necessary for accessing the data conversion server, to the client to which a first authority has been granted according to the first authority information;

second issuing, after verification of the first authorization token, which is received from the data conversion server, and the second authority information, a second authorization token that is necessary for causing the token exchange server to issue a temporary URL to the data conversion server to which a second authority has been granted according to the second authority information;

converting data to be printed into print data;

generating the temporary URL, after receipt of the second authorization token from the data conversion server and verification, by the authorization server, of the second authorization token; and transmitting requests using the temporary URL to the second server system after receipt of the temporary URL.

7. The method according to claim 6, wherein in a case where second authority information received from the data conversion server is authority information for causing an operation of uploading the data to be printed to the second server system to be performed, the generation unit generates a temporary URL for performing uploading, and, in a case where the second authority information is the authority information indicating that an operation of downloading the print data is performed, the generation unit generates a temporary URL for performing downloading.

8. The method according to claim 6, wherein the first issuance unit, which has received authentication information and a scope and has been requested by the client to issue the first authorization token, confirms that the received authentication information matches authentication information registered in a database, then checks whether or not information related to the received scope is included in a scope associated with the authentication information, and issues the first authorization token in response to having successfully confirmed that the information related to the received scope is included in the scope associated with the authentication information.

9. The method according to claim 8, wherein a scope associated with authentication information on the data conversion server includes both the scope indicating that the operation of uploading the data to be printed is performed, and the scope indicating that the operation of downloading the print data is performed.

10. The method according to claim 6, wherein the data conversion server transmits an error to the client in a case where the data conversion server has failed to confirm that the print service is available to the client, based on the first authorization token.

11. A non-transitory storage medium storing a computer-executable program executable of instruction for causing a computer to perform a method of a printing system that includes a first server system, a second server system for communicating a client,
the first server system being configured to provide a print service, and including an authorization server, a token exchange server and a data conversion server,
the second server system being configure to provide a storage service and belonging to a security domain different from a security domain to which the first server system belongs,
the client belonging to a security domain different from the security domain to which the first server system belongs and from the security domain to which the second server system belongs,
the method comprising:
associating first authority information for accessing the data conversion server with identification information of the client, and configured to associate second authority information for executing a specific operation on the second server system with identification information of the data conversion server;

first issuing, after verification of the first authority information received from the client, a first authorization token that is necessary for accessing the data conversion server, to the client to which a first authority information has been granted according to the first authority information;
second issuing, after verification of the first authorization token, which is received from the data conversion server, and the second authority information, a second authorization token that is necessary for causing the token exchange server to issue a temporary URL to the data conversion server to which a second authority has been granted according to the second authority information;
converting data to be printed into print data;
generating the temporary URL, after receipt of the second authorization token from the data conversion server and verification, by the authorization server, of the second authorization token; and
transmitting requests using the temporary URL to the second server system after receipt of the temporary URL.

12. The non-transitory storage medium according to claim 11, wherein in a case where second authority information received from the converting is authority information for causing an operation of uploading the data to be printed to the second server system to be performed, the generating generates a temporary URL for performing uploading, and, in a case where the second authority information is the authority information indicating that an operation of downloading the print data is performed, the generating generates a temporary URL for performing downloading.

13. The non-transitory storage medium according to claim 11, wherein the issuing, which has received authentication information and a scope and has been requested by the client to issue the first authorization token, confirms that the received authentication information matches authentication information registered in a database, then checks whether or not information related to the received scope is included in a scope associated with the authentication information, and issues the first authorization token response to having successfully confirmed that the information related to the received scope is included in the scope associated with the authentication information.

14. The non-transitory storage medium according to claim 13, wherein a scope associated with authentication information on the generating includes both the scope indicating that the operation of uploading the data to be printed is performed, and the scope indicating that the operation of downloading the print data is performed.

15. The non-transitory storage medium according to claim 11, wherein the converting includes transmitting an error to the client in a case where the converting has failed to confirm that the print service is available to the client, based on the first authorization token.

* * * * *